(12) United States Patent
Wadewitz et al.

(10) Patent No.: US 8,920,115 B2
(45) Date of Patent: Dec. 30, 2014

(54) COMPOSITE MATERIAL AND METHOD

(75) Inventors: Danny N. Wadewitz, Derby (GB);
Alison J. McMillan, Uttoxeter (GB);
Bijoysri Khan, Ripley (GB)

(73) Assignee: Rolls-Royce PLC, London (GB)

( * ) Notice: Subject to any disclaimer, the term of this patent is extended or adjusted under 35 U.S.C. 154(b) by 657 days.

(21) Appl. No.: 13/186,954

(22) Filed: Jul. 20, 2011

(65) Prior Publication Data
US 2012/0034089 A1 Feb. 9, 2012

(30) Foreign Application Priority Data

Aug. 6, 2010 (GB) .................................. 1013227.2

(51) Int. Cl.
F04D 29/38 (2006.01)
B29C 70/24 (2006.01)
F01D 5/28 (2006.01)
B29L 31/08 (2006.01)
B29L 31/30 (2006.01)

(52) U.S. Cl.
CPC .............. B29C 70/24 (2013.01); F01D 5/282 (2013.01); B29L 2031/08 (2013.01); B29L 2031/3076 (2013.01); Y02T 50/672 (2013.01); Y02T 50/673 (2013.01)
USPC ......... 415/182.1; 415/200; 428/104; 428/223

(58) Field of Classification Search
CPC ....................................................... F01D 5/282
USPC ....................... 416/223 R, 230, 229 A, 241 A; 415/182.1, 200
See application file for complete search history.

(56) References Cited

U.S. PATENT DOCUMENTS

| 4,563,785 | A | * | 1/1986 | Samelson ..................... 428/102 |
| 5,344,280 | A | * | 9/1994 | Langenbrunner et al. ........ 415/9 |
| 5,490,602 | A | * | 2/1996 | Wilson et al. .................... 216/56 |
| 2003/0203179 | A1 | | 10/2003 | Hawkins et al. |
| 2009/0087309 | A1 | * | 4/2009 | Schreiber ..................... 415/200 |
| 2009/0098337 | A1 | * | 4/2009 | Xie et al. ..................... 428/121 |

FOREIGN PATENT DOCUMENTS

| DE | 199 52 443 A1 | 5/2001 |
| EP | 0 073 648 A2 | 3/1983 |
| EP | 0 556 089 A1 | 8/1993 |
| FR | 2 664 941 A1 | 1/1992 |
| GB | 1 320 539 | 6/1973 |
| GB | 1 500 776 A | 2/1978 |
| GB | 2 249 592 A | 5/1992 |
| GB | 2288441 A * | 10/1995 |

OTHER PUBLICATIONS

Nov. 29, 2011 European Search Report issued in European Application No. EP 11 17 4685.
Search Report issued in British Application No. 1013227.2 dated Dec. 3, 2010.

* cited by examiner

Primary Examiner — Dwayne J White
Assistant Examiner — Justin Seabe
(74) Attorney, Agent, or Firm — Oliff PLC

(57) ABSTRACT

A composite material and method for manufacturing the material, the material including: a plurality of plies layered one on top of the other; and one or more through-thickness fibers which join one or more of the plurality of plies to one another; wherein the one or more through-thickness fibers form a boundary which delineates one or more discrete regions of the material.

6 Claims, 5 Drawing Sheets

COMPOSITE MATERIAL AND METHOD

CROSS-REFERENCE TO RELATED APPLICATIONS

This invention claims the benefit of UK Patent Application No. 1013227.2, filed on 6 Aug. 2010, which is hereby incorporated herein in its entirety.

SUMMARY

The present invention relates to a composite material and a method of manufacturing the material, and particularly but not exclusively to the use of the material in a component for a turbomachine.

A composite component may be constructed by laying up several plies of fabric to produce a fabric preform for the component. The preform is essentially a series of planar layers of fibres, having various orientations. The plies of fabric may be joined together using through-thickness fibres. For example, tufting, stitching and Z-pinning are examples of techniques for joining the plies of fabric.

FIG. 1 shows a section of a fabric preform 2. The preform 2 comprises a plurality of plies 4 which are constructed from woven or unidirectional (UD) fabric. The plies 4 are held together by individual tufts 6 and/or a row of tufts 8.

The tufts 6, 8 are created with a needle which draws a piece of fibre through the thickness of the layers of fabric, extends far enough through to leave a loop 10, and pulls back. The needle then moves along and repeats the operation. Because the thickness of the material is quite great, the tuft stays in place, but the through-thickness fibre is not locked in place as would be the case with stitching. The loop 10 at the bottom of the tuft, the free ends 12 of the tuft and/or the thread 14 crossing to the next tuft are present in the preform 2, and without further steps prior to moulding this can lead to an unsightly or poor quality surface finish.

In the case of stitching, there are several forms, and the basic idea is that a continuous fibre is drawn repeatedly though the thickness of the fabric. The most commonly known method is equivalent to a home sewing machine, where two lengths of fibre are used and they lock each other (twist over each other) at some point above, below or in the middle of the fabric. This is not ideal as the curvature put into the fibre at the point of locking can significantly weaken the fibre. This is particularly the case with high strength fibres, such as would be needed to give significant through-thickness reinforcement. For this reason, stitching is best used as a means for making a preform more convenient to handle during manufacture processing, rather than as a means for imparting through-thickness strength.

The stitching process can also be problematic where there is little or no access to one side of the fabric. This can be the case in a complex preform. There are techniques that use two needles, both acting from the same side, and work together to lock the stitches together on the hidden side of the fabric. Hand sewing techniques, often with curved needles, are also possible; but hand sewing is not very practical for large quantities of sewing, and may be difficult to ensure repeatable quality. This is not to mention the health hazard of such close work with carbon fibres.

In the case of Z-pinning, a rigid fibre is used; this could either be a metal pin, or a piece of carbon or other fibre cured in a light coating of matrix material. The Z-pin is then pushed through the thickness of the layered fabric and held in place by friction. There are several methods for pushing the pin into the fabric; ideally it is necessary to push a whole domain of pins into the material all at once, to reduce distortion of the fabric, and also to reduce processing time of what could be a long and fiddly process. This can be done by pushing the pins into a piece of foam material, so that they are all correctly aligned. The foam material is then laid over the layered fabric, and a press pushes down onto the foam. As the foam compresses, the pins are forced into the layered fabric to form the preform.

It is also possible to create a fabric preform with through-thickness joining using a 3D weaving technique. In this case the fabric is built up on a loom, with multiple warp and weft fibres. It is possible to choose when to interlock the full thickness of the weave using a special type of warp fibre (a binder), or to allow the various layers to run significant lengths without full through-thickness interconnection. The binder fibre can be identical to the other warp fibres, however this is only practical for angle interlock or layer to layer type weaves, where the direction change in the warp is gradual. Where vertical through-thickness connection is required, the binder fibre is usually a lighter fibre that is more able to bend.

It is known to use the above methods, particularly Z-pinning and tufting, to reinforce a component preform at particular locations which would be prone to delamination under normal or severe design loads. However, the main difficulty with this is that while the location that has been reinforced becomes more able to withstand the load, the tendency to delaminate is transferred to another location on the preform. Reinforcing the whole preform is a possibility, though an expensive one.

Another issue with over use of through-thickness reinforcement is that it leads to reduced in-plane material properties, particularly localised to the area around the reinforcement.

FIG. 2 is an enlarged view of the preform 2 of FIG. 1, showing the effect of a tuft 8 as it passes through the plies 4. As shown, the tuft 8 penetrates a tow of fibres 16 on the surface ply. Consequently, the tow 16 becomes distorted since individual fibres within the tow are broken at the penetration point or are bent around the tuft fibre.

FIG. 3 shows a cross-section of the preform 2 after tufting. As shown, the thickness of the preform 2 is increased in the region of the tufts 6. The thickness of the preform 2 increases in this region for two reasons. Firstly, the action of passing the needle into the fabric disturbs the fabric and pushes the layers apart. Thus the bottom surface is pushed down as the needle passes into the fabric, and the top surface is pulled up as the needle is pulled back out. To some extent this distortion can be recovered when the preform is pressed into the mould, but this would lead to buckling of the tuft fibres which would be crushed within the preform 2. Instead, it is advisable to improve the tufting process such that this form of deformation is limited as far as is possible. The second mechanism for increasing thickness is that the in-plane tows that are distorted by the insertion of the tuft fibre are moved to one side, and so the tow geometry is disturbed, such that the tow becomes thicker to accommodate the disturbed fibres. This is unavoidable and a consequence of conservation of volume, but the extent can be minimised with appropriate tuft spacing, choice of fibre thickness, and needle shape and thickness.

Through-thickness reinforcement can be used to arrest or prevent delamination. Delaminations can occur as a result of impact events, such as a birdstrike on a blade, blade debris striking fan containment casings, FOD (foreign object damage) on a range of types of component, etc.

The delamination of the component can be beneficial since it absorbs the energy of impact. However, when delamination spreads to a critical region of the component it can result in failure of the component.

The present invention seeks to provide a controlled delamination of the component so as to absorb the energy of an impact effectively and other advantages.

In accordance with an aspect of the invention there is provided a composite material comprising: a plurality of plies layered one on top of the other; and one or more through-thickness fibres which join one or more of the plurality of plies to one another; wherein the one or more through-thickness fibres form a boundary which delineates one or more discrete regions of the material.

The one or more regions may be substantially rectangular, triangular, or hexagonal. The regions may be tessellated. The regions may have a non-tessellating shape, for example they may be circular. Preferably the regions may be made up from a series of longer straight lines as this aids the ease and speed of the component manufacture as the device inserting the through-thickness fibres can follow a continuous path.

The one or more through-thickness fibres may form a continuous or broken line.

The one or more through-thickness fibres may be arranged in a single line or in multiple lines.

The one or more through-thickness fibres may be formed by tufting, stitching, Z-pinning or 3D weaving.

The one or more through-thickness fibres may extend through the plies at an angle which is orthogonal or oblique to the plies.

The composite material may be used to form a turbomachine component.

The composite material may be used to form a fan blade.

The one or more regions may be provided at a tip, leading edge and/or trailing edge of the fan blade.

The one or more regions of the composite material may be not located at a central region of the fan blade.

The composite material may be used to form a containment casing of a turbomachine.

The one or more regions may be substantially triangular with the sides of the triangle being aligned to provide stiffness in circumferential, helical and axial directions of the containment casing.

The location of the regions may be selected to adjust the vibrational characteristics of the component. By determining the vibrational response for selected modes the anti-nodes may be calculated or measured and by positioning the regions at or around the anti-nodes it is possible to reduce the risk of stress damage to the component.

In accordance with another aspect of the invention there is provided a method of manufacturing a composite material, the method comprising: layering a plurality of plies one on top of the other; passing one or more through-thickness fibres through the plies to join one or more of the plurality of plies to one another; wherein the one or more through-thickness fibres forms a boundary which delineates one or more discrete regions of the material.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION OF THE EMBODIMENTS

Figure 1:
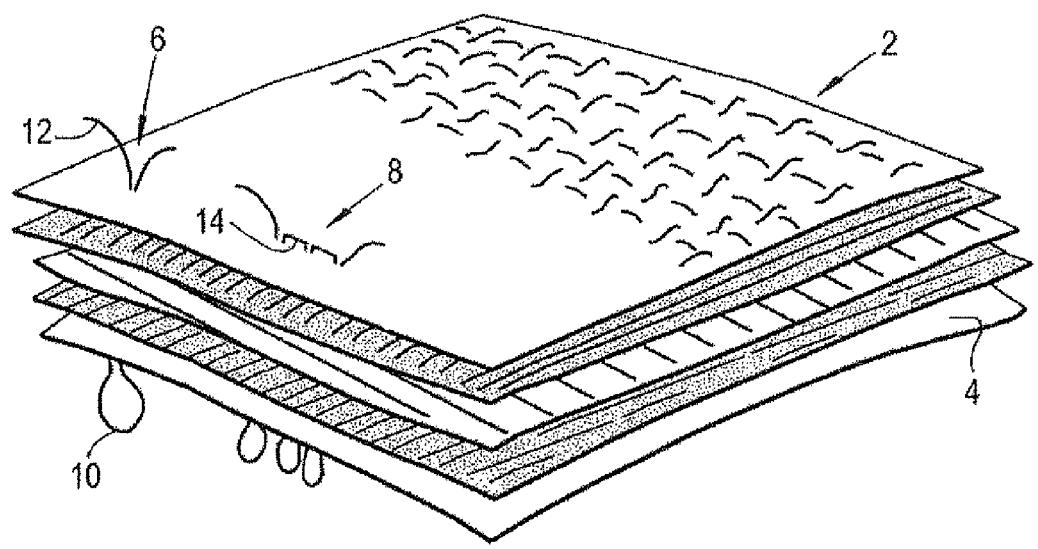
FIG. 1 is a perspective view of a section of a conventional fabric preform.
Figure 2:
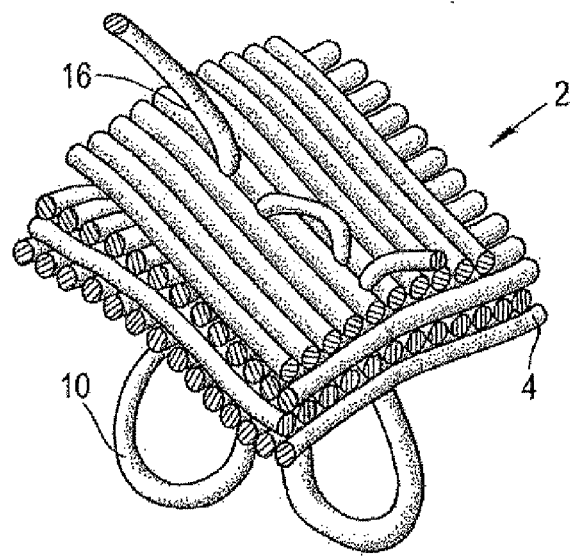
FIG. 2 is an enlarged view of the preform of FIG. 1.
Figure 3:
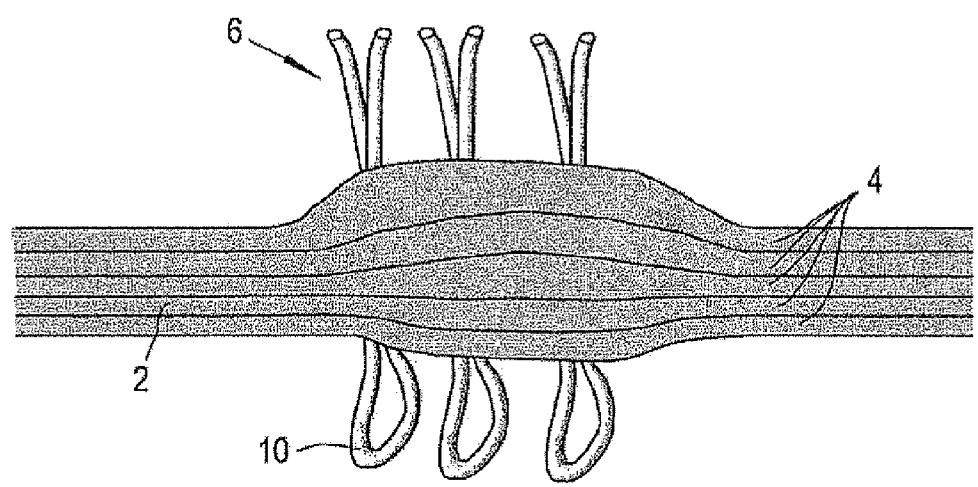
FIG. 3 is a cross-sectional view of the preform of FIG. 1 after tufting.
Figure 4:
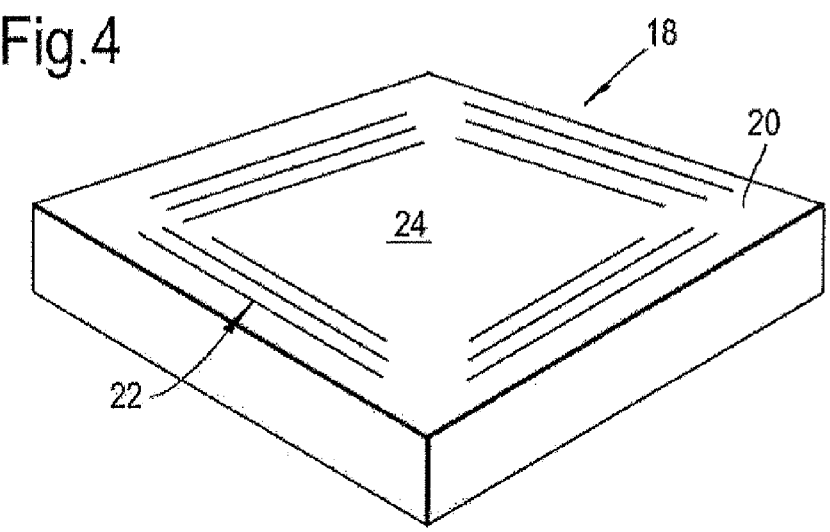
FIG. 4 is a composite material in accordance with an embodiment of the invention.

FIG. 4 is a perspective view of a composite material 18 in accordance with an embodiment of the invention.

The composite material 18 is constructed from a plurality of plies (not shown) which are layered one on top of the other to form the base material 20.

One or more through-thickness fibres 22 are passed through the plies to join them to one another. The through thickness fibres 22 may be formed by tufting, stitching, Z-pinning or 3D weaving or other conventional techniques.

The through-thickness fibres 22 are arranged in lengths which substantially enclose a region of the composite material. The said region comprises a rectangle, such as a square and the through thickness fibres 22 are arranged in lengths which form sides of the rectangle or square. In the embodiment shown in FIG. 4, the through-thickness fibres form three concentric rectangles. Although the sides of the rectangles do not meet at the corners, the gaps between the lengths are sufficiently small to inhibit delamination from passing through the gaps. Thus, the through-thickness fibres 22 substantially enclose a rectangular delamination region 24.

The composite material 18 may be used to form a component which is subject to impact events. In use, when the component undergoes an impact event, the composite material 18 is allowed to delaminate, i.e. the plies of the material separate from one another, in the rectangular delamination region 24 since it has no through-thickness fibres in this area. The delamination absorbs the energy from the impact. However, the delamination is inhibited from extending to areas outside of the rectangular delamination region 24 by the boundary formed by the through-thickness fibres 22.

Figure 5:
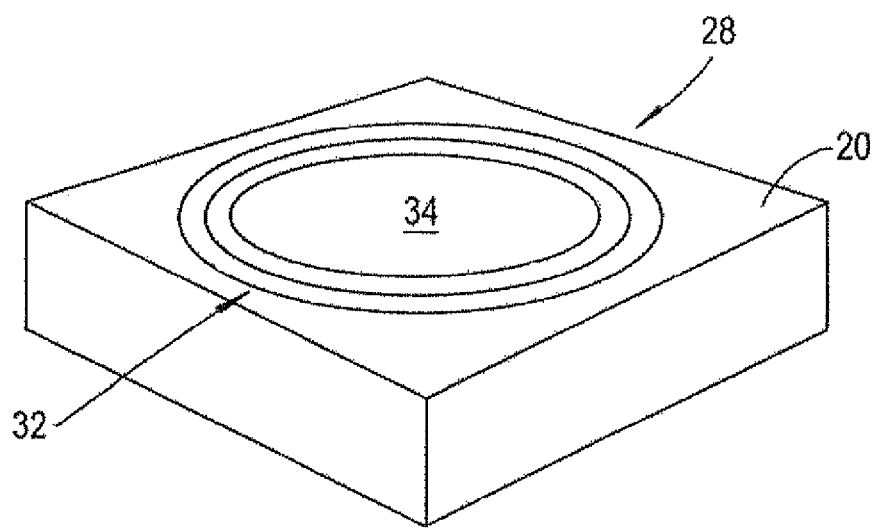
FIG. 5 is a composite material in accordance with another embodiment of the invention.

FIG. 5 is a perspective view of a composite material 28 in accordance with another embodiment of the invention.

Like the embodiment of FIG. 4, the composite material is constructed from a plurality of plies (not shown) which are layered one on top of the other to form the base material 20.

One or more through-thickness fibres 32 are passed through the plies to join them to one another. The through thickness fibres 32 may be formed by tufting, stitching, Z-pinning or 3D weaving or other conventional techniques.

As shown, the through-thickness fibres 32 are arranged in a circle. In the embodiment shown in FIG. 5, the through-thickness fibres 32 form three concentric circles, which substantially enclose a circular delamination region 34.

The composite material 28 may be used to form a component which is subject to impact events. In use, when the component undergoes an impact event, the composite material 28 is allowed to delaminate in the circular delamination region 34 since it has no through-thickness fibres in this area. The delamination absorbs the energy from the impact. However, the delamination is inhibited from extending to areas outside of the circular delamination region 34 by the boundary formed by the through-thickness fibres 32.

In the embodiments of FIGS. 4 and 5, the total delamination area of any single delamination region is restricted by the boundary formed by the through-thickness fibres. This has several advantages: (i) the though-thickness fibres perform the duty of holding the component together, and help to maintain the overall component integrity, (ii) limiting the size of a delamination region also limits the delamination opening (i.e. bulging out of the delaminated area), which means that in the case of an aerofoil which has regions of delamination, the aerofoil shape is not too badly compromised, and (iii) the limited opening also means that the delaminated surfaces are more firmly held in a state of sliding contact with each other, which means more mechanical energy (either from the initial or further impact or from flutter or forced vibration of the aerofoil arising due to its shape change and/or stiffness reduction) would be absorbed through friction processes.

Figure 6:
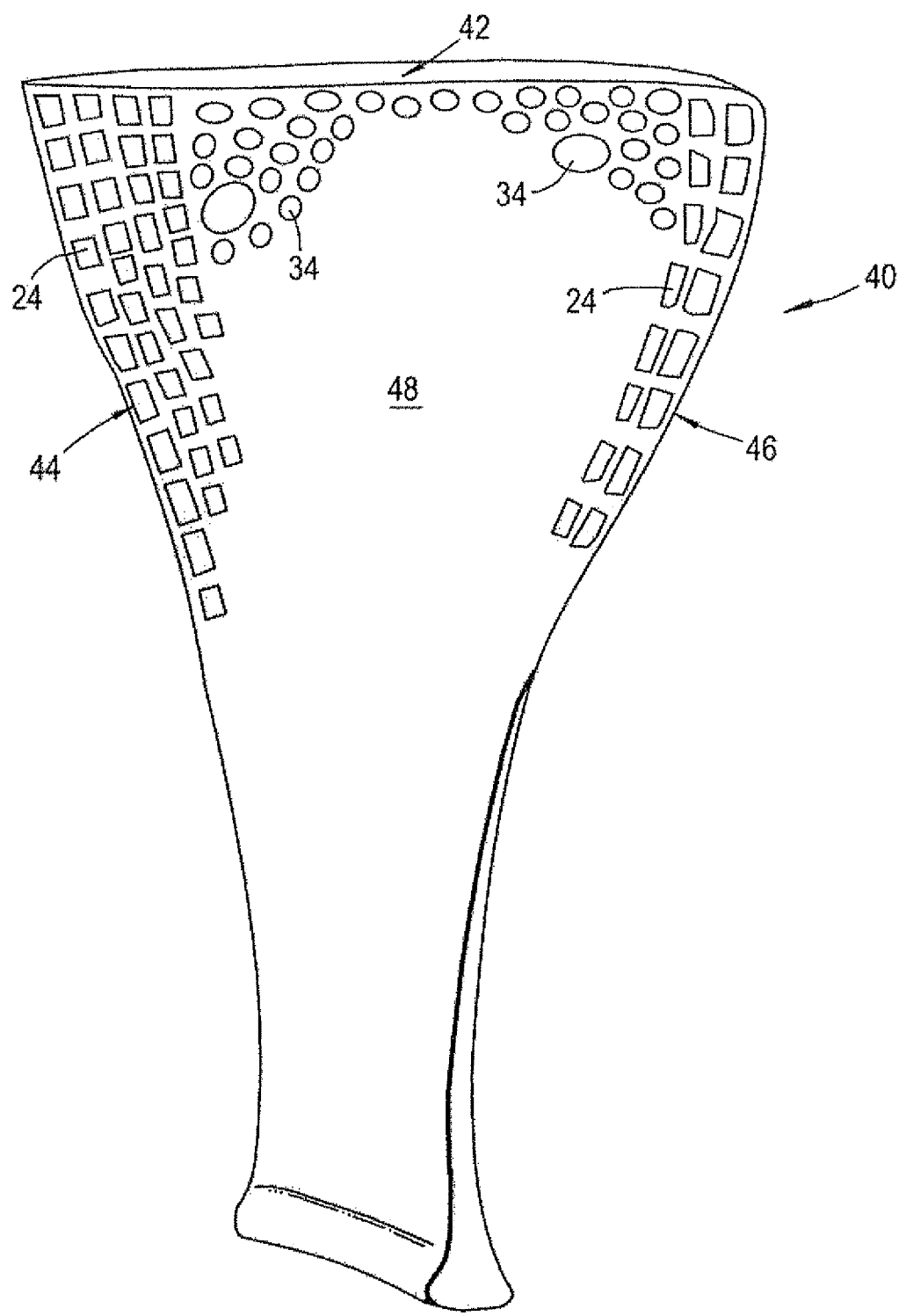
FIG. 6 is a perspective view of a fan blade constructed using the composite material of FIG. 4.

FIG. 6 is a perspective view of a fan blade 40 constructed from a composite material according to an embodiment of the invention. The fan blade 40 comprises a tip 42 and leading and trailing edges 44, 46. These areas are most at risk of delamination initialisation. These areas are thinner than a central region 48 of the fan blade 40, and contribute less towards its overall stiffness. The particular shape and profile of the tip 42 and leading and trailing edges 44, 46 is designed to maximise the aerodynamic performance of the fan blade 40. Consequently, loss of precise geometry as a result of an impact would lead to a reduction in aerodynamic efficiency. It can also be sufficient to cause flutter of the blade. Furthermore, loss of actual blade material would lead to an imbalance in the fan set which would make the flight uncomfortable, and could cause damage to the bearing system in the engine and the engine mounting system.

The fan blade is therefore provided with rectangular delamination regions 24 at the leading and trailing edges 44, 46 and circular delamination regions 34 at the tip 42. The rectangular delamination regions 24 and circular delamination regions 34 may be of different sizes and are configured to absorb the anticipated impact experienced at those particular locations of the fan blade 40. The regions 24, 34 are distributed in areas most at risk of delamination so that those areas are allowed to delaminate in a controlled way. It will be appreciated that the shapes of the regions are exemplary and others e.g. square, hexagonal and other regular or irregularly shaped polygons may be used in these locations.

The central region 48 of the fan blade 40 is not provided with any delamination regions. The through-thickness fibres may reduce the in-plane material strength and stiffness and therefore, since the central region 48 provides most of the stiffness and strength to the fan blade 40, it is undesirable for the central region 48 to contain through-thickness fibres.

In use, when the fan blade 40 undergoes an impact event, the composite material is allowed to delaminate in the regions 24, 34 since it has no through-thickness fibres in this area. The delamination absorbs the energy from the impact. However, the delamination is prevented from extending to areas outside of the regions 24, 34 by the boundary formed by the through-thickness fibres. The through-thickness fibres also prevent the delamination from extending to other regions.

As the central region 48 is not typically a site for delamination initialisation it is not, in this embodiment, provided with any delamination regions. Delamination extending from the blade edges is inhibited by the delamination regions and therefore the fan blade 40 retains most of its stiffness following the impact event. Other embodiments may have delamination regions in this area.

As described previously, the through-thickness fibres maintain the integrity of the fan blade 40. This prevents material from being lost and maintains the balance in the fan set. Furthermore, the size of a delamination region limits the delamination opening (i.e. bulging out of the delaminated area) and thus the fan blade 40 retains a better aerodynamic profile following an impact event.

Airworthiness requirements following a bird strike event require that the engine is capable of a short period of continued flight at reduced thrust. A fan set remaining in reasonable balance, and having modest aerofoil distortion is consistent with this requirement.

Following the impact event, engine related vibration may occur, and flutter is certainly more likely as the delamination causes some shape change in the aerofoil of the fan blade 40. However, such vibration is minimised and may be controlled either by operating the fan at a lower rotation speed or by the friction between delaminated plies.

The delamination regions minimise the damage to the fan blade 40 and thus enables the engine to continue to operate, or provides more flight time before engine shutdown becomes necessary.

Although not shown, the composite material comprising the delamination regions could also be used in a containment casing. A containment casing is responsible for containing a failed fan blade, whilst retaining sufficient integrity to perform structural duty such that the shutdown engine does not hazard the aircraft on fly-home.

As described above, the delamination regions provide a means for allowing impact energy absorption through controlled delamination, and the through-thickness fibres hold the component together. In this particular application the containment casing must have circumferential, torsional and axial stiffness. Therefore, the delamination regions are substantially triangular such that the sides of the delamination region are aligned to circumferential, helical and axial directions of the containment casing. In the event of a fan blade failure, the material would resist impact punch through by absorbing the energy of impact through distributed controlled delamination. Furthermore after delamination, the through-thickness fibres would act as a net containing the heavy debris. In the case that some through-thickness fibres fail in tension, this would be localised (i.e. to the particular region where the impact happened). Following delamination, the delamination regions would still be strength bearing in tension and would pick up the load, although they would stretch to a larger diameter. To provide additional containment capabilities, multiple layers of material comprising delamination regions could be employed.

Figure 7:
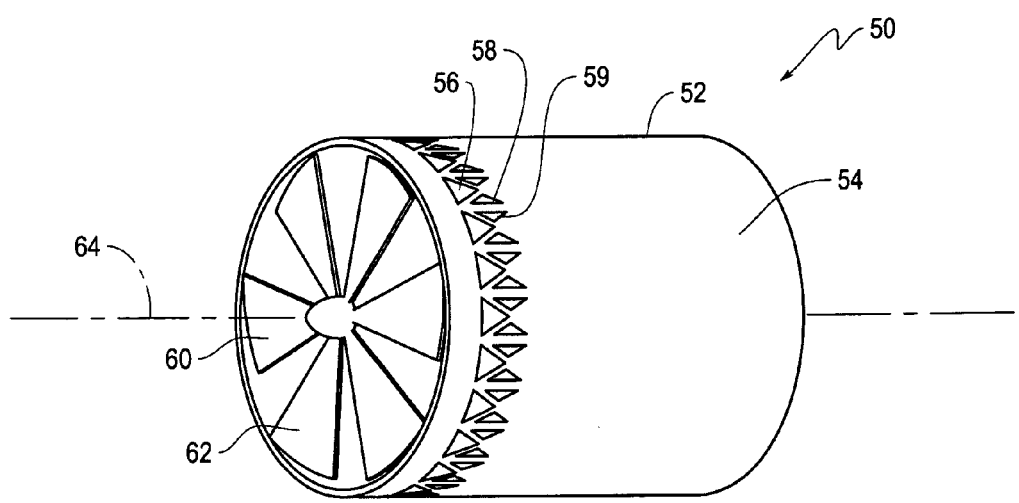
FIG. 7 is a perspective view of containment casing of a turbomachine comprising the composite material of FIG. 4.

FIG. 7 shows a containment casing 52 of a turbomachine 50, comprising a composite material 54 in which one or more regions 56, 58, 59 are delineated by a boundary formed by the through-thickness fibres of the composite material.

Although, the rectangles and circles of FIGS. 4 and 5 have been described as being concentric, this need not be the case.

In FIGS. 4 to 6, the lengths of through-thickness fibres are shown as continuous lines, however this need not be case. Instead, the through-thickness fibres may form broken lines. However, the gaps between adjacent through-thickness fibres should be sufficiently small to prevent delamination from passing through the gaps.

The fan blade 40 of FIG. 6 is described as not containing any delamination regions in the central region 48, however the central region 48 may contain some delamination regions so long as this does not adversely effect the strength and stiffness of the fan blade 40.

The present invention could be applied to other components. The delamination regions would be located in areas where delamination will have minimal consequence to the structural integrity of the component. Furthermore, the delamination regions are configured to prevent spread of delamination to regions of the component where delamination would lead to catastrophic failure. Ideally, delamination would be encouraged to occur between multiple plies in the same region, rather than being allowed to travel right across the component between a single pair of plies.

The present invention could be applied to other aerofoil structures and annular structures such as OGVs (Outlet Guide Vanes), wings, and other structures that may be subject to bird strike or bird slurry strike.

In addition, the invention may be used to provide controlled expansion of delamination in areas subject to FOD, for example in nacelles. In this case, delamination will show by giving a localised bulge, but the through-thickness fibre boundary would inhibit further delamination propagation for long enough for the delamination region to be repaired or replaced during normal service intervals.

The applications of the present invention are not limited to aerospace components, and may for example be used in military ship hulls or submarine bodies. In these vessels, there is a need to withstand high rate shock loading from explosives set off near to the vessel. The shock is transmitted by the water, and effects of shock wave transmission, reflection and transmission can cause through-thickness tension as well as compression loading. Composites are not so strong in through-thickness tension, unless there are through-thickness reinforcement fibres. Creation of delamination regions may allow for a controlled release of a section of hull, so rather than the hull ripping open, and water flooding in uncontrollably, a small piece of the hull is compromised, but the area around the delamination region survives. This would result in release of internal pressure in one zone of the vessel, and controlled in-flow of water. However, this may allow time for crew to escape to another region of the vessel, and prevent total compromise of the vessel. If the damage is small enough, it may also be (temporarily) repaired by divers from the inside, so that repair can be achieved without dry-docking, or in the case of a submarine, while still submerged.

The present invention may also be used for propeller blades. The action of the propellers is to create thrust by rotation of the propeller blades. The action creates pressure variation in the water, and this can cause cavitation in the water. Cavitation is a damaging phenomenon, and typically causes pitting in metallic components. In composites, it can lead to delamination. In military vessels, cavitation is detectable, so may enable enemy vessels to detect the presence of a submarine. Indeed any sonic or electromagnetic variation creates a signature which could be detectable, and metallic components are also detectable by radar. So for this reason, composite components are known to be preferred over metallic. Replacement of metallic propellers by composite ones is desirable, if the load bearing duty and design issues can be overcome. Delamination regions may ensure robust reliability though at the expense of a gradually reducing efficiency as the hydrofoil shape is distorted by controlled delamination growth. Monitoring of hydrofoil efficiency may be an effective means of monitoring the amount of delamination, and hence the safe service life left in the component.

While the composite material of the present invention has been described in relation to its use in all-composite materials, it is to be understood that it may also be used in components which are only part-constructed from composite materials.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A containment casing of a turbomachine, the containment casing comprising a composite material comprising:
   a plurality of plies layered one on top of the other; and
   a plurality of through-thickness fibres which join one or more of the plurality of plies to one another, wherein
   the plurality of through-thickness fibres form a boundary which delineates one or more discrete regions of the composite material,
   the one or more regions do not contain any through-thickness fibres, and
   the one or more regions are substantially triangular or hexagonal with the sides of the triangle or hexagon being aligned in circumferential, helical, and axial directions of the containment casing to provide stiffness in said direction in case of delamination of said one or more regions.

2. The containment casing as claimed in claim 1, wherein the plurality of through-thickness fibres forms a continuous or broken line.

3. The containment casing as claimed in claim 1, wherein the plurality of through-thickness fibres joins one or more of the plurality of plies to one another by tufting, stiching, Z-pinning, or 3D weaving.

4. The containment casing as claimed in claim 1, wherein the plurality of through-thickness fibres extends through the plies at an angle which is orthogonal or oblique to the plies.

5. A turbomachine comprising the containment casing as claimed in claim 1.

6. A method of manufacturing the containment casing as claimed in claim 1, the method comprising:
   layering the plurality of plies one on top of the other; and
   passing the one or more through-thickness fibres through the plies to join the one or more of the plurality of plies to one; another,
   wherein the one or more through-thickness fibres forms the boundary which delineates the one or more discrete regions of the composite material.

* * * * *